Aug. 14, 1956 — B. W. HERTEL — 2,758,405
FISH GIGGING DEVICE
Filed Oct. 20, 1953
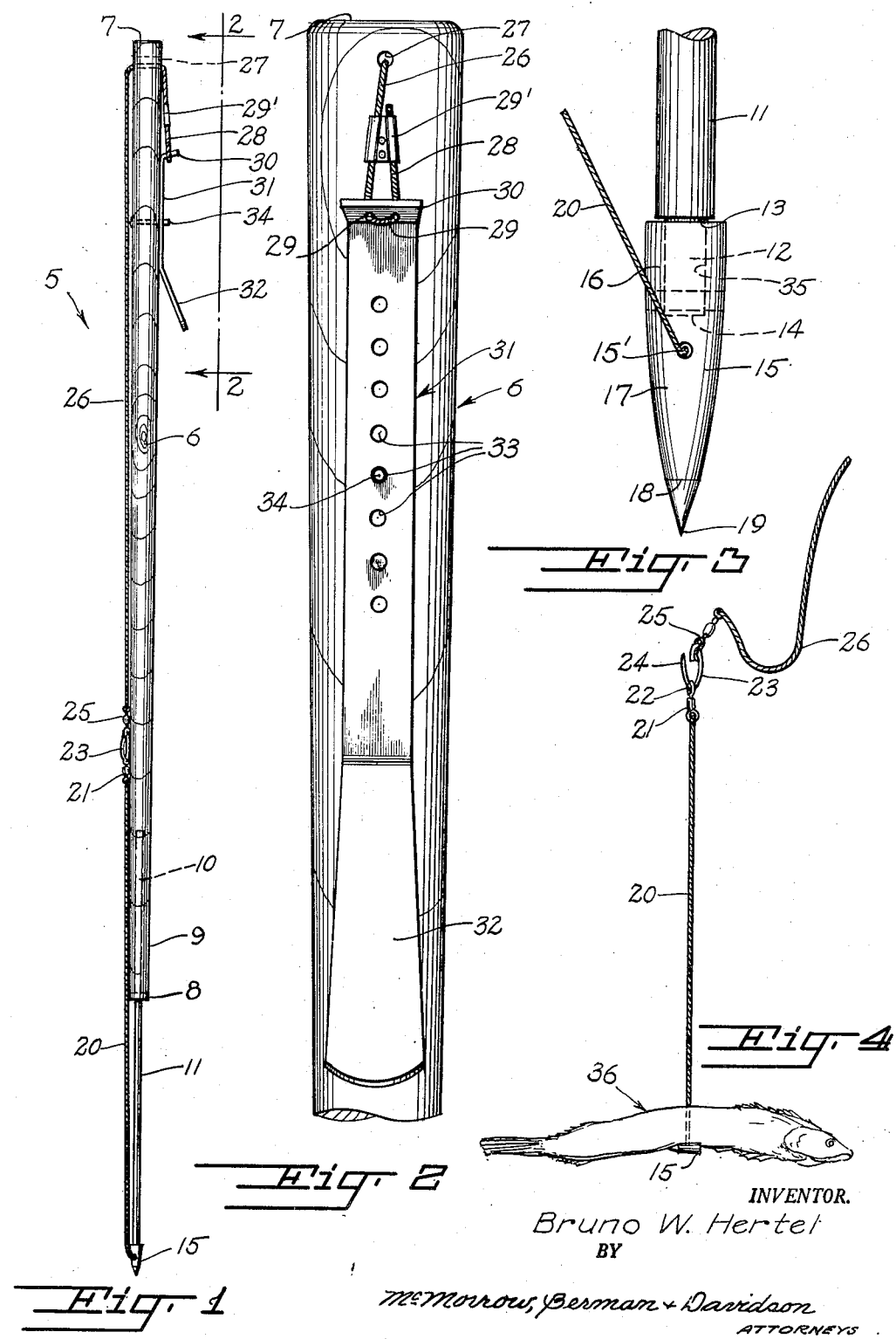
INVENTOR.
Bruno W. Hertel
BY
McMorrow, Berman & Davidson
ATTORNEYS

United States Patent Office 2,758,405
Patented Aug. 14, 1956

2,758,405

FISH GIGGING DEVICE

Bruno W. Hertel, Houston, Tex.

Application October 20, 1953, Serial No. 387,090

3 Claims. (Cl. 43—6)

This invention relates to a novel and improved gig for gig fishing, and the primary object of the invention is to provide a more efficient and effective device of this kind which is easier to use, is more accurate in use, and which does not materially mutilate or scar a fish speared thereby.

Other important objects and advantageous features of the invention will be apparent from the following description and the accompanying drawings, wherein for purposes of illustration rather than limitation, a specific embodiment of the invention is set forth in detail.

In the drawings:

Figure 1 is a side elevation view, showing the said embodiment in assembled condition.

Figure 2 is an enlarged fragmentary side elevation view of the upper part thereof.

Figure 3 is a similar view of the lower part thereof.

Figure 4 is a schematic view showing a gigged fish held on the line or cable.

Referring in detail to the drawings, wherein like numerals designate like parts throughout the several views, the illustrated device, generally designated 5, comprises an elongated, round, preferably hardwood handle 6, which tapers downwardly and gradually from its upper end 7. On its lower end the handle 6 has a metal ferrule 8, and extending axially through the ferrule 8 and the lower end 9 of the handle is the upper part 10 of a preferably steel rod 11 which has a reduced lower end portion 12 defining a shoulder 13 spaced upwardly from its lower end 14.

A preferably steel point 15 has a cylindrical upper portion 16 which merges into a gradually downwardly tapering lower portion 17 terminating in a lower end 18 on which is fixed a hardened steel conical tip 19 (see Fig. 3).

A preferably metal lower cable section 20 has a lower end fixedly secured to the side of the point 15 at a point intermediate the ends of the point 15, as indicated at 15'. The cable section 20 is of a length to extend upwardly alongside of the lower part of the handle 6 and is provided on its upper end with a sinker 21 followed by an eye 22.

The snap hook 23 has an openable member 24 which is engaged through the eye 22, the snap hook 23 being connected by another sinker 25 with an upper cable section 26. The upper cable section 26 is long enough to reach to the upper end 7 of the handle 6, pass to the other side of the handle 6 through a transverse bore 27 provided in the handle 6 near its upper end 7, and reach downwardly for a short distance to a point below the upper end 7.

The upper end of the upper cable section 26 has thereon a loop 28 which is maintained closed by a clip 29'. The loop 28 passes through holes 29, 29 in a lateral flange or lug 30 on the upper end of a cable release member 31.

The cable release member 31 is in the form of a vertically elongated flat metal bar which is normally positioned lengthwise of the handle 6, and has on its lower end a laterally outwardly and downwardly angulated handle 32. The upper part of the cable release bar 31 is provided with a plurality of longitudinally spaced holes 33 which are selectively engageable over a detent pin 34 which projects radially from the side of the handle 6 at a point spaced downwardly from the bore 27. The detent pin 34 is engaged in that one of the holes 33 which will desirable tension the cable sections 20 and 26 so as to keep the reduced lower end portion 12 of the rod 11 in the socket 35 in the upper end of the point 15, and thereby hold the point 15 in operative position for spearing a fish 36.

The above described device is used for spearing or gigging a fish 36 by driving the point 15 through a fish and then releasing the release bar 31 from the pin 34, so as to permit the upper cable section to move downwardly until the loop clip 29' engages the side of the handle 6. This is accompanied by downward movement of the lower cable section 20 and release of the point 15 from the lower end of the rod 11, so that the point 15 remains at one side of the fish 36, as shown in Figure 4, with the lower cable section 20 emerging from the other side of the fish 36.

The fish 36 is then removed by opening the snap hook 23, disengaging the snap hook from the eye 22 and pulling the lower cable section 20 through the fish 36. To reset the device, the snap hook 23 is reengaged with the eye 22, the point 15 is restored on the lower end of the rod 11, and the release bar 31 is engaged with the detent pin 34, so as to tension the cable sections 20 and 26 and hold the point 15 in place.

What is claimed is:

1. In a fish gigging device comprising an elongated handle having an upper end and a lower end, said lower end being arranged to have a point separably secured thereto, and a cable having a lower end securable to the point and said upper end, the improvement consisting of cable tensioning means comprising a portion of the upper end of the handle over which the cable is trained from one side of the handle to the opposite side of the handle, and a member mounted on said opposite side of the handle for movement toward and away from said portion of the handle, the upper end of the cable being secured to said member at a point below said portion, said member comprising a release bar having longitudinally spaced holes formed therethrough, and means releasably mounting said release bar on the handle comprising a detent pin on and projecting laterally from said opposite side of the handle with which holes of the release bar are selectively engageable.

2. In a fish gigging device comprising an elongated handle having an upper end and a lower end, said lower end being arranged to have a point separably secured thereto, and a cable having a lower end securable to the point and an upper end, the improvement consisting of cable tensioning means comprising a portion of the upper end of the handle over which the cable is trained from one side of the handle to the opposite side of the handle, and a member mounted on said opposite side of the handle for movement toward and away from said portion of the handle, the upper end of the cable being secured to said member at a point below said portion, said member comprising a release bar having longitudinally spaced holes formed therethrough, and means releasably mounting said release bar on the handle comprising a detent pin on and projecting laterally from said opposite side of the handle with which holes of the release bar are selectively engageable, said release bar having an upper end having a lateral lug to which the upper end of the cable is secured.

3. In a fish gigging device comprising an elongated handle having an upper end and a lower end, said lower end being arranged to have a point separably secured thereto, and a cable having a lower end securable to the point and an upper end, the improvement consisting of cable tensioning means comprising a portion of the upper end of the handle over which the cable is trained from one side of the handle to the opposite side of the handle, and a member mounted on said opposite side of the handle for movement toward and away from said portion of the handle, the upper end of the cable being secured to said member at a point below said portion, said member comprising a release bar having longitudinally spaced holes formed therethrough, and means releasably mounting said release bar on the handle comprising a detent pin on and projecting laterally from said opposite side of the handle with which holes of the release bar are selectively engageable, said release bar having an upper end having a lateral lug to which the upper end of the cable is secured and a lower end having an outwardly regulated handle portion.

References Cited in the file of this patent
UNITED STATES PATENTS

| | | |
|---|---|---|
| 19,363 | Harkness | Feb. 16, 1858 |
| 1,403,550 | Hinsdale | Jan. 17, 1922 |
| 2,236,427 | Garrison | Mar. 25, 1941 |
| 2,461,030 | Brickman | Feb. 8, 1949 |
| 2,548,102 | Elliott | Apr. 10, 1951 |
| 2,601,362 | Bowers | June 24, 1952 |
| 2,643,888 | Hargis | June 30, 1953 |
| 2,667,814 | Blackmon | Feb. 2, 1954 |

FOREIGN PATENTS

| | | |
|---|---|---|
| 411,731 | Italy | June 9, 1945 |